United States Patent [19]
Saito et al.

[11] Patent Number: 5,786,555
[45] Date of Patent: Jul. 28, 1998

[54] POLARIZABLE ELECTRODE FOR ELECTRIC DOUBLE-LAYER CAPACITOR, AND ELECTRIC DOUBLE-LAYER CAPACITOR USING SAID POLARIZABLE ELECTRODE

[75] Inventors: Kazuo Saito; Atsushi Hagiwara; Toshiharu Okamoto; Kazutoshi Hamada; Osamu Hasegawa, all of Tokyo, Japan

[73] Assignee: Nisshinbo Industries, Inc., Tokyo, Japan

[21] Appl. No.: 689,275

[22] Filed: Aug. 6, 1996

[30] Foreign Application Priority Data

Aug. 11, 1995 [JP] Japan .................. 7-227173

[51] Int. Cl.$^6$ .................................. C25B 11/12
[52] U.S. Cl. .................. 204/294; 361/502; 361/508; 361/516
[58] Field of Search .................. 361/502, 508, 361/516; 252/500, 518; 204/294

[56] References Cited

U.S. PATENT DOCUMENTS 5,150,283 9/1992 Yoshida et al. .................. 361/502
5,450,279 9/1995 Yoshida et al. .................. 361/502
5,597,661 1/1997 Takeuchi et al. .................. 252/518

*Primary Examiner*—Bruce F. Bell
*Attorney, Agent, or Firm*—Kubovcik & Kobovcik

[57] ABSTRACT

The present invention provides:

a polarizable electrode for use in electric double-layer capacitor, which is made of a carbon composite material composed mainly of:

100 parts by weight of an activated carbon, 0.05 parts by weight of an amorphous carbon, 0.1–1,000 parts by weight of a conductive agent, and 0.03–90 parts by weight of a fibrillated carbon; and an electric double-layer capacitor comprising at least one pair of a positive electrode and a negative electrode each containing the above polarizable electrode and each impregnated with an electrolytic solution.

The above polarizable electrode and electric double-layer capacitor are substantially free from the drawbacks of conventional polarizable electrodes and conventional electric double-layer capacitors, have a low internal resistance and a long life, and can be charged with or can discharge a large electric current of several amperes to several hundreds of amperes momentarily.

11 Claims, No Drawings

POLARIZABLE ELECTRODE FOR ELECTRIC DOUBLE-LAYER CAPACITOR, AND ELECTRIC DOUBLE-LAYER CAPACITOR USING SAID POLARIZABLE ELECTRODE

BACKGROUND OF THE INVENTION (1) Field of the Invention

The present invention relates to a polarizable electrode for use in electric double-layer capacitors, and an electric double-layer capacitor using said polarizable electrode.

(2) Description of the Prior Art

Electric double-layer capacitors are in use in the form of a small but large-capacity capacitor as a backup electric source for memory of microcomputers, etc. Electric double-layer capacitors commercialized currently, however, have a high internal resistance and enable charging and discharging of only up to about several milliamperes. Hence, it is desired to develop an electric double-layer capacitor having a low internal resistance and capable of being charged with or discharging momentarily a large electric current of several amperes to several hundreds of amperes.

In order to develop a polarizable electrode for use in electric double-layer capacitors, capable of being charged with or discharging a large electric current, there have hitherto been made various proposals. There were proposed, for example, a polarizable electrode obtained by firing a mixture of an activated carbon powder and a phenolic resin in an inert atmosphere [Japanese Patent Application Kokai (Laid-Open) No. 288361/1992], a polarizable electrode obtained by activating a carbon foam of block form [Japanese Patent Application Kokai (Laid-Open) No. 141629/1991], and a shaped article obtained from a fluororesin which forms fibrils upon receipt of a shear stress [Japanese Patent Application Kokai (Laid-Open) No. 211994/1994].

In the polarizable electrode disclosed in Japanese Patent Application Kokai (Laid-Open) No. 288361/1992, however, an electrolytic solution is unable to infiltrate sufficiently into the electrode when the electrode is thick, which results in increased internal resistance of the electrode. In the polarizable electrode disclosed in Japanese Patent Application Kokai (Laid-Open) No. 141629/1991, the activation takes place only at the surface of the carbon foam and does not proceed into the inside, making it difficult to obtain a large electrostatic capacity per unit volume or unit weight. In the shaped article disclosed in Japanese Patent Application Kokai (Laid-Open) No. 211994/1994, use of the fluororesin (which is an insulating material) as a polarizable electrode for an electric double-layer capacitor gives a higher electrode strength but an increased internal resistance.

Hence, it was proposed to reduce the internal resistance of a polarizable electrode by adding a thermoplastic resin to a polarizable electrode and subjecting the electrode to a heat treatment to pyrolyze the thermoplastic resin and generate pores (Japanese Patent Application Kokai (Laid-Open) No. 99141/1995).

The polarizable electrode disclosed in Japanese Patent Application Kokai (Laid-Open) No. 99141/1995, however, has problems. That is, since the thermoplastic resin added does not take part in electrode reaction, the packing density of activated carbon is reduced and resultantly the electrostatic capacity per unit volume is reduced; moreover, an increase in the amount of the thermoplastic resin added gives a fragile electrode.

OBJECT AND SUMMARY OF THE INVENTION

The object of the present invention is to eliminate the drawbacks of conventional polarizable electrodes and provide (1) a polarizable electrode for use in an electric double-layer capacitor, having a low internal resistance and a long life and capable of being charged with or discharging momentarily a large electric current of several amperes to several hundreds of amperes and (2) an electric double-layer capacitor using said polarizable electrode.

In order to achieve the above object, the present inventors made a study. As a result, the present inventors came up with an idea that since a fibrillated carbon, when used as a component of a polarizable electrode, gives a polarizable electrode having a high holding power for an electrolytic solution and a high packing density of activated carbon and is substantially free from detachment of activated carbon, such a polarizable electrode may provide an electric double-layer capacitor having a low internal resistance, a long life and a high output. The present inventors made a further study based on the above idea and have completed the present invention.

According to the present invention, there is provided a polarizable electrode for use in electric double-layer capacitors, which is made of a carbon composite material composed mainly of:

100 parts by weight of an activated carbon, 0.05–90 parts by weight of an amorphous carbon, 0.1–1,000 parts by weight of a conductive agent, and 0.03–90 parts by weight of a fibrillated carbon.

According to the present invention, there is further provided an electric double-layer capacitor comprising at least one pair of a positive electrode and a negative electrode each containing the above polarizable electrode and each impregnated with an electrolytic solution.

DETAILED DESCRIPTION OF THE INVENTION

Specific description is made below on the polarizable electrode for use in electric double-layer capacitors and the electric double-layer capacitor using said polarizable electrode, both according to the present invention.

In the present invention, the activated carbon used as a component of the carbon composite material is not particularly restricted with respect to type and includes those obtained by carbonizing a natural fiber (e.g., sawdust or coconut husk), an aromatic polycyclic compound present in coal, petroleum or the like, or a synthetic resin of a phenolic resin type, acrylic resin type, aromatic polyamide type, cellulose type or the like and then activating the resulting material by an ordinary method.

The form of the activated carbon may be a powder, granules or a fiber. The specific surface area of the activated carbon has no particular restriction, either, but is preferably 500 m$^2$/g or more. When the activated carbon is a powder, the particle diameter thereof is desirably, for example, 0.1–500 µm; when the activated carbon is granules, the granule diameter is desirably, for example, 1–5 mm; and when the activated carbon is a fiber, the fiber diameter is desirably, for example, 5–50 µm and the fiber length is desirably, for example, 50 µm to 5 mm.

In the present invention, the amorphous carbon used as a component of the carbon composite material corresponds to a binder in the prior art and is obtained, for example, by firing a thermosetting resin in a non-oxidizing atmosphere. This amorphous carbon is a carbon material which has long been known. The thermosetting resin used for producing the amorphous carbon includes, for example, a polycarbodiimide resin, a phenolic resin, a furan resin, an epoxy resin, a melamine resin and a cellulose, but is not restricted thereto.

In the present invention, the conductive agent used as a component of the carbon composite material is, for example, at least one member selected from an expanded graphite, a carbon black, an acetylene black and a Ketjen black each having a resistivity of 100 mΩ or less, but is not restricted thereto.

In the present invention, the fibrillated carbon used as a component of the carbon composite material can be obtained by firing a fibrillated polymer in a non-oxidizing atmosphere. A polymer having a crystal structure even in a small extent can be made into a fibrillated polymer, for example, by applying a shear force thereto.

The raw material used for producing the fibrillated carbon is exemplified by a polycarbodiimide resin, a phenolic resin, a furan resin, an epoxy resin, a cellulose, a polyacrylonitrile, an aramid resin, a polyimide, a pitch and a rayon, but is not restricted thereto and other fibrillated polymers can be used as well.

In producing the polarizable electrode of the present invention for use in electric double-layer capacitors, first there are mixed the activated carbon, the amorphous carbon, the conductive agent and the fibrillated carbon to obtain an activated carbon mixture. In this mixing step, there can be used a conventional means such as stirring rod, kneader, mixer, static mixer, ribbon mixer, Banbury mixer, roll mixer, screw mixer, ball mill or the like, all used in the mixing of components such as mentioned above. The activated carbon mixture may further be made into granules by the use of a tumbling granulator, an extrusion granulator, a compression granulator, a spray granulator, a fluidized bed granulator, a disintegration granulator or the like.

The activated carbon mixture is fired as mentioned later. Therefore, when the amorphous carbon is made from a thermosetting resin and the fibrillated carbon is made from a fibrillated polymer, it is more convenient to use, in the activated carbon mixture, a thermosetting resin in place of the amorphous carbon and a fibrillated polymer in place of the fibrillated carbon.

When, in the above mixing step, a shear stress can be applied to the activated carbon mixture, it is more convenient to use, in place of the fibrillated carbon, a polymer which becomes fibrils upon receipt of a shear force. (The following description is made on the more convenient case.)

The proportions of the activated carbon and the fibrillated polymer can be determined depending upon, for example, the intended properties of the polarizable electrode to be obtained, but are, for example, 0.1–100 parts by weight of the fibrillated polymer per 100 parts by weight of the activated carbon. When the proportion of the fibrillated polymer is less than 0.1 part by weight, no sufficient bonding strength or conductivity is obtained. When the proportion of the fibrillated polymer is more than 100 parts by weight, the packing density of the activated carbon is insufficient.

The proportions of the activated carbon and the thermosetting resin as well can be determined depending upon, for example, the intended properties of the polarizable electrode to be obtained, but are, for example, 0.1–100 parts by weight of the thermosetting resin per 100 parts by weight of the activated carbon. When the proportion of the thermosetting resin is less than 0.1 part by weight, no sufficient bonding strength is obtained. When the proportion of the thermosetting resin is more than 100 parts by weight, the activated carbon surface is covered more than necessary, resulting in reduced electrostatic capacity.

The proportions of the activated carbon and the conductive agent as well can be determined depending upon, for example, the intended properties of the polarizable electrode to be obtained, but are, for example, 0.1–1,000 parts by weight of the conductive agent per 100 parts by weight of the activated carbon. When the proportion of the conductive agent is less than 0.1 part by weight, no sufficient conductivity is obtained. When the proportion of the conductive agent is more than 1,000 parts by weight, while there is substantially no increase in conductivity any more, the amount of the activated carbon per unit volume decreases, resulting in reduced electrostatic capacity.

The activated carbon mixture is then molded into a desired dimension as necessary. This molding step can be conducted by a conventional means such as pressure molding, hydrostatic molding, extrusion molding, injection molding, belt pressing, press heating, roll pressing or the like.

The molded material obtained above is then fired. This firing step can be conducted by any conventional method in a non-oxidizing atmosphere such as a vacuum, argon, nitrogen or the like. The firing temperature has no upper limit but the firing is desirably conducted at 600°–1,500° C., preferably at 700°–1,300° C. Firing at a temperature higher than 1,500° C. incurs a decrease in surface area of the activated carbon and a consequent reduction in electrostatic capacity. Firing at a temperature lower than 600° C. incurs an increase in internal resistance of an electrode and a reduction in electrostatic capacity.

The fired molded material is a carbon composite material composed mainly of:

100 parts by weight of an activated carbon,
0.05–90 parts by weight of an amorphous carbon,
0.1–1,000 parts by weight of a conductive agent, and
0.03–90 parts by weight of a fibrillated carbon.

In order to allow the carbon composite material to have the above composition, the weight change of each component of the activated carbon mixture, in the firing step is measured beforehand and the proportion of each component in the activated carbon mixture is determined based on the weight change. Incidentally, the activated carbon and the conductive agent show substantially no weight change under the above-mentioned firing conditions; the thermosetting resin has a carbonization yield of 50–90% at 600°–1,500° C. (the thermosetting resin becomes an amorphous carbon upon carbonization); the fibrillated polymer has a carbonization yield of 30–90% at 600–1,500° C. (the fibrillated polymer becomes a fibrillated carbon upon carbonization).

The thus-obtained carbon composite material can be used as a polarizable electrode of the present invention for electric double-layer capacitors, as it is or after being cut into an appropriate shape.

The polarizable electrode is bonded to a current collector using an appropriate conductive adhesive, followed by impregnation with an appropriate electrolytic solution, whereby an intended electric double-layer capacitor is produced. In the bonding, a heat-treatment or a heat-pressing may be conducted at an appropriate temperature. When the current collector has heat resistance, firing may be conducted in a non-oxidizing atmosphere.

The current collector can be a liquid-impermeable material such as glassy carbon, conductive rubber, conductive plastic or the like. The electrolytic solution can be exemplified by organic electrolytic solutions obtained by dissolving $LiAsF_6$, $LiPF_4$, $LiClO_4$, tetraalkylammonium or tetrafluoroborate in butylene carbonate, γ-butyrolactone, acetonitrile, 1,2-dimethoxy ethane, sulfolane, nitromethane, propylene carbonate, ethylene carbonate, dimethyl carbonate or a mixture thereof; and aqueous electrolytic solutions obtained by dissolving, in water, KOH, NaOH, $H_2SO_4$, HCl, $HNO_3$, $ZnCl_2$ or $ZnBr_2$.

The present invention is hereinafter described specifically by way of Examples.

EXAMPLES 1–10

The following materials were mixed for 1 hour using a mixer:

- an activated carbon (average particle diameter: 10 μm; specific surface area: 1,800 m²/g),
- a polycarbodiimide resin powder (average particle diameter: 10 μm; carbonization yield: 85% at 700° C., 82% at 1,000° C., 75% at 1,300° C.) (a product of Nisshinbo Industries, Inc.),
- an expanded graphite powder (average particle diameter: 10 μm), and
- a fibrillated polycarbodiimide resin pulp (carbonization yield: 85% at 700° C., 82% at 1,000° C., 75% at 1,300° C.) (a product of Nisshinbo Industries, Inc.).

The compositions of the resulting mixtures are shown in Table 1. Each mixture was placed in a square mold having an internal dimension of 100 mm×100 mm and subjected to pressure molding at a pressure of 30 kg/cm² at 130° C. for 30 minutes. Each of the molded products was fired in a nitrogen gas atmosphere at 700° C., 1,000° C. or 1,300° C. Each of the fired products was cut into a plate of 1.5 mm (thickness)×15 mm×15 mm to form a polarizable electrode. Each polarizable electrode was bonded to a glassy carbon (a product of Nisshinbo Industries, Inc.) acting as a current collector, using a conductive adhesive.

Each bonded product was used as a positive electrode and a negative electrode and vacuum-impregnated with a 30% aqueous sulfuric acid solution to form an electric double-layer capacitor. Each electric double-layer capacitor was measured for equivalent series resistance, electrostatic capacity per unit volume at the 1st cycle and electrostatic capacity per unit volume at the 5,000th cycle. The results are shown in Table 1. Incidentally, equivalent series resistance was determined by passing a constant current of 1 kHz and 10 mA through each capacitor and measuring the voltage between the two electrodes. Electrostatic capacity per unit volume was calculated by subjecting each capacitor to charging and discharging of 20 mA, measuring the time taken for voltage reduction from 1 V to 0 V, calculating the electrostatic capacity from the time, and dividing the electrostatic capacity by the volume of electrode.

TABLE 1

| | Examples | | | | | | | | | |
|---|---|---|---|---|---|---|---|---|---|---|
| | 1 | 2 | 3 | 4 | 5 | 6 | 7 | 8 | 9 | 10 |
| Activated carbon | 100 | 100 | 100 | 100 | 100 | 100 | 100 | 100 | 100 | 100 |
| Polycarbodiimide resin | 0.1 | 0.1 | 0.1 | 0.1 | 0.1 | 0.1 | 100 | 100 | 100 | 100 |
| Expanded graphite | 0.1 | 0.1 | 0.1 | 0.1 | 1000 | 1000 | 0.1 | 0.1 | 1000 | 1000 |
| Fibril-like polycarbodiimide resin pulp | 0.1 | 0.1 | 0.1 | 100 | 0.1 | 100 | 0.1 | 100 | 0.1 | 100 |
| Firing temperature (°C.) | 700 | 1000 | 1300 | 1000 | 1000 | 1000 | 1000 | 1000 | 1000 | 1000 |
| Equivalent series resistance (mΩ) | 5.4 | 5.0 | 4.8 | 2.6 | 3.4 | 1.2 | 7.5 | 2.0 | 4.1 | 1.8 |
| Electrostatic capacity (F/cm³) | | | | | | | | | | |
| at 1st cycle | 35.4 | 41.6 | 37.2 | 38.6 | 37.2 | 36.1 | 33.2 | 35.3 | 35.1 | 34.7 |
| at 5,000th cycle | 35.1 | 41.3 | 36.8 | 38.3 | 36.7 | 35.7 | 33.0 | 35.1 | 34.8 | 34.5 |

EXAMPLES 11–18

The following materials were mixed for 1 hour using a mixer:

- an activated carbon (average particle diameter: 10 μm; specific surface area: 1,800 m²/g),
- a phenolic resin powder (average particle diameter: 10 μm; carbonization yield: 82% at 1,000° C.),
- an expanded graphite powder (average particle diameter: 10 μm), and
- a fibrillated cellulose (carbonization yield: 30% at 1,000° C. (a product of Nisshinbo Industries, Inc.).

The compositions of the resulting mixtures are shown in Table 2. Each mixture was placed in a square mold having an internal dimension of 100 mm×100 mm and subjected to pressure molding at a pressure of 30 kg/cm² at 130° C. for 30 minutes. Each of the molded products was fired in a nitrogen gas atmosphere at 1,000° C. Each of the fired products was cut into a plate of 1.5 mm (thickness)×15 mm×15 mm to form a polarizable electrode. Each polarizable electrode was bonded to a glassy carbon (a product of Nisshinbo Industries, Inc.) acting as a current collector, using a conductive adhesive.

Each bonded product was used as a positive electrode and a negative electrode and vacuum-impregnated with a 30% aqueous sulfuric acid solution to form an electric double-layer capacitor. Each electric double-layer capacitor was measured for equivalent series resistance, electrostatic capacity per unit volume at the 1st cycle and electrostatic capacity per unit volume at the 5,000th cycle, in the same manners as in Example 1. The results are shown in Table 2.

EXAMPLE 19

Materials having the same composition as Example 10 were mixed for 1 hour using a mixer. The resulting mixture was subjected to granulation using a tumbling granulator to prepare granules. The composition of the granules is shown in Table 2. The granules were placed in a square mold having an internal dimension of 100 mm×100 mm and subjected to pressure molding at a pressure of 30 kg/cm$^2$ at 130° C. for 30 minutes. The molded product was fired in a nitrogen gas atmosphere at 1,000° C. The fired product was cut into a plate of 1.5 mm (thickness)×15 mm×15 mm to form a polarizable electrode. The polarizable electrode was bonded to a glassy carbon (a product of Nisshinbo Industries, Inc.) acting as a current collector, using a conductive adhesive.

The bonded product was used as a positive electrode and a negative electrode and vacuum-impregnated with a 30% aqueous sulfuric acid solution to form an electric double-layer capacitor. The electric double-layer capacitor was measured for equivalent series resistance, electrostatic capacity per unit volume at the 1st cycle and electrostatic capacity per unit volume at the 5,000th cycle, in the same manners as in Example 1. The results are shown in Table 2.

EXAMPLE 20

In the composition of Example 10, the fibrillated polycarbodiimide resin pulp was replaced by a cellulose fiber (carbonization yield: 30% at 1,000° C.). The resulting materials were mixed for 1 hour using a mixer so that the cellulose fiber was converted into fibrils by a shear stress. The resulting mixture was subjected to granulation using a tumbling granulator to prepare granules. The composition of the granules is shown in Table 2. The granules were placed in a square mold having an internal dimension of 100 mm×100 mm and subjected to pressure molding at a pressure of 30 kg/cm$^2$ at 130° C. for 30 minutes. The molded product was fired in a nitrogen gas atmosphere at 1,000° C. The fired product was cut into a plate of 1.5 mm (thickness)×15 mm×15 mm to form a polarizable electrode. The polarizable electrode was bonded to a glassy carbon (a product of Nisshinbo Industries, Inc.) acting as a current collector, using a conductive adhesive.

The bonded product was used as a positive electrode and a negative electrode and vacuum-impregnated with a 30% aqueous sulfuric acid solution to form an electric double-layer capacitor. The electric double-layer capacitor was measured for equivalent series resistance, electrostatic capacity per unit volume at the 1st cycle and electrostatic capacity per unit volume at the 5,000th cycle, in the same manners as in Example 1. The results are shown in Table 2.

EXAMPLE 21

An electric double-layer capacitor was produced in the same manner as in Example 10 except that the electrolytic solution was changed from the 30% aqueous sulfuric acid solution to a propylene carbonate solution containing 1 mol/l of tetrabutylammonium perchlorate. The electric double-layer capacitor was measured for equivalent series resistance, electrostatic capacity per unit volume at the 1st cycle and electrostatic capacity per unit volume at the 5,000th cycle, in the same manners as in Example 1. The results are shown in Table 2.

TABLE 2

| | Examples | | | | | | | | | | |
|---|---|---|---|---|---|---|---|---|---|---|---|
| | 11 | 12 | 13 | 14 | 15 | 16 | 17 | 18 | 19 | 20 | 21 |
| Activated carbon | 100 | 100 | 100 | 100 | 100 | 100 | 100 | 100 | 100 | 100 | 100 |
| Polycarbodiimide resin | | | | | | | | | 100 | 100 | 100 |
| Phenolic resin | 0.1 | 0.1 | 0.1 | 0.1 | 100 | 100 | 100 | 100 | | | |
| Expanded graphite | 0.1 | 0.1 | 1000 | 1000 | 0.1 | 0.1 | 1000 | 1000 | 1000 | 1000 | 1000 |
| Fibril-like polycarbodiimide resin pulp | | | | | | | | | 100 | | 100 |
| Cellulose | 0.1 | 100 | 0.1 | 100 | 0.1 | 100 | 0.1 | 100 | | 100 | |
| Firing temperature (°C.) | 1000 | 1000 | 1000 | 1000 | 1000 | 1000 | 1000 | 1000 | 1000 | 1000 | 1000 |
| Equivalent series resistance (mΩ) | 6.8 | 6.2 | 5.9 | 3.8 | 8.9 | 3.5 | 5.6 | 3 | 1.7 | 1.6 | 800 |
| Electrostatic capacity (F/cm$^3$) | | | | | | | | | | | |
| at 1st cycle | 35.1 | 36.5 | 35.1 | 34.3 | 31.1 | 34.1 | 33.8 | 33.3 | 35.4 | 35.3 | 18.2 |
| at 5,000th cycle | 34.4 | 36.0 | 34.4 | 32.0 | 39.9 | 33.7 | 32.1 | 31.8 | 35.1 | 18.1 | 15.5 |

COMPARATIVE EXAMPLE 1

The following materials were mixed for 1 hour:

100 parts by weight of an activated carbon (average particle diameter: 10 μm; specific surface area: 1,800 m$^2$/g), 100 parts by weight of a phenolic resin powder (average particle diameter: 10 μm; carbonization yield: 82% at 1,000° C.), and 1,000 parts by weight of an expanded graphite powder (average particle diameter: 10 μm).

The resulting mixture was placed in a square mold having an internal dimension of 100 mm×100 mm and subjected to pressure molding at a pressure of 30 kg/cm$^2$ at 130° C. for 30 minutes. The molded product was fired in a nitrogen gas atmosphere at 1,000° C. The fired product was cut into a plate of 1.5 mm (thickness)×15 mm×15 mm to form a polarizable electrode. The polarizable electrode was bonded to a glassy carbon (a product of Nisshinbo Industries, Inc.) acting as a current collector, using a conductive adhesive.

The bonded product was used as a positive electrode and a negative electrode and vacuum-impregnated with a 30% aqueous sulfuric acid solution to form an electric double-layer capacitor. The electric double-layer capacitor was measured for equivalent series resistance, electrostatic capacity per unit volume at the 1st cycle and electrostatic capacity per unit volume at the 5,000th cycle, in the same manners as in Example 1. The results are shown in Table 3.

COMPARATIVE EXAMPLE 2

The following materials were mixed for 1 hour:

100 parts by weight of an activated carbon (average particle diameter: 10 μm; specific surface area: 1,800 m$^2$/g), 100 parts by weight of a phenolic resin powder (average particle diameter: 10 μm; carbonization yield: 82% at 1,000° C.), and 30 parts by weight of a polymethyl methacrylate powder (average particle diameter: 10 μm; carbonization yield: 0% at 1,000° C.) (a product of Nisshinbo Industries, Inc.).

The resulting mixture was placed in a square mold having an internal dimension of 100 mm×100 mm and subjected to pressure molding at a pressure of 30 kg/cm² at 130° C. for 30 minutes. The molded product was fired in a nitrogen gas atmosphere at 1,000° C. The fired product was cut into a plate of 1.5 mm (thickness)×15 mm×15 mm to form a polarizable electrode. The polarizable electrode was bonded to a glassy carbon (a product of Nisshinbo Industries, Inc.) acting as a current collector, using a conductive adhesive.

The bonded product was used as a positive electrode and a negative electrode and vacuum-impregnated with a 30% aqueous sulfuric acid solution to form an electric double-layer capacitor. The electric double-layer capacitor was measured for equivalent series resistance, electrostatic capacity per unit volume at the 1st cycle and electrostatic capacity per unit volume at the 5,000th cycle, in the same manners as in Example 1. The results are shown in Table 3.

COMPARATIVE EXAMPLES 3–8

The following materials were mixed for 1 hour using a mixer:

an activated carbon (average particle diameter: 10 μm; specific surface area: 1,800 m²/g), a polycarbodiimide resin powder (average particle diameter: 10 μm; carbonization yield: 82% at 1,000° C.) (a product of Nisshinbo Industries, Inc.), an expanded graphite powder (average particle diameter: 10 μm), and a fibrillated polycarbodiimide resin (fiber length: 0.5 mm; carbonization yield: 82% at 1,000° C.) (a product of Nisshinbo Industries, Inc.).

The compositions of the resulting mixtures are shown in Table 3. Each mixture was placed in a square mold having an internal dimension of 100 mm×100 mm and subjected to pressure molding at a pressure of 30 kg/cm² at 130° C. for 30 minutes. Each of the molded products was fired in a nitrogen gas atmosphere at 1,000° C. Each of the fired products was cut into a plate of 1.5 mm (thickness)×15 mm×15 mm to form a polarizable electrode. Each polarizable electrode was bonded to a glassy carbon (a product of Nisshinbo Industries, Inc.) acting as a current collector, using a conductive adhesive.

Each bonded product was used as a positive electrode and a negative electrode and vacuum-impregnated with a 30% aqueous sulfuric acid solution to form an electric double-layer capacitor. Each electric double-layer capacitor was measured for equivalent series resistance, electrostatic capacity per unit volume at the 1st cycle and electrostatic capacity per unit volume at the 5,000th cycle, in the same manners as in Example 1. The results are shown in Table 3.

COMPARATIVE EXAMPLE 9

The polarizable electrode used in Comparative Example 2 was bonded to a glassy carbon (a product of Nisshinbo Industries, Inc.) acting as a current collector, using a conductive adhesive.

The bonded product was used as a positive electrode and a negative electrode and vacuum-impregnated with a propylene carbonate solution containing 1 mol/l of tetrabutylammonium perchlorate, to form an electric double-layer capacitor. The electric double-layer capacitor was measured for equivalent series resistance, electrostatic capacity per unit volume at the 1st cycle and electrostatic capacity per unit volume at the 5,000th cycle, in the same manners as in Example 1. The results are shown in Table 3.

TABLE 3

| | Comparative Examples | | | | | | | | |
|---|---|---|---|---|---|---|---|---|---|
| | 1 | 2 | 3 | 4 | 5 | 6 | 7 | 8 | 9 |
| Activated carbon | 100 | 100 | 100 | 100 | 100 | 100 | 100 | 100 | 100 |
| Polycarbodiimide resin | | | 50 | 50 | 50 | 50 | 0.05 | 2000 | 100 |
| Phenolic resin | 100 | 100 | | | | | | | |
| Expanded graphite | 1000 | | 500 | 500 | 0.05 | 2000 | 500 | 500 | |
| Fibril-like polycarbodiimide resin pulp | | | 0.05 | 2000 | 50 | 50 | 50 | 50 | |
| Polymethyl methacrylate | | 30 | | | | | | | 30 |
| Firing temperature (°C.) | 1000 | 1000 | 1000 | 1000 | 1000 | 1000 | 1000 | 1000 | 1000 |
| Equivalent series resistance (mΩ) | 45.4 | 30.4 | 70.4 | 50.1 | 280 | 30.2 | — | 400 | 74000 |
| Electrostatic capacity (F/cm³) | | | | | | | | | |
| at 1st cycle | 20 | 17.1 | 15.2 | 10.2 | 8.2 | — | — | 2.5 | 2.5 |
| at 5,000th cycle | 10.2 | — | 15 | — | 1.2 | — | — | 2 | 2 |

—: Electrodes collapsed into pieces and measurement was impossible.

The polarizable electrode of the present invention for use in electric double-layer capacitors is made of a carbon composite material composed mainly of:

100 parts by weight of an activated carbon, 0.05–90 parts by weight of an amorphous carbon, 0.1–1,000 parts by weight of a conductive agent, and 0.03–90 parts by weight of a fibrillated carbon;

is substantially free from the drawbacks of conventional polarizable electrodes; has a low internal resistance and a long life and can be charged with or can discharge a large electric current of several amperes to several hundreds of amperes momentarily.

What is claimed is:

1. A polarizable electrode for use in electric double-layer capacitor, which is made of a carbon composite material composed mainly of:

100 parts by weight of an activated carbon, 0.05–90 parts by weight of an amorphous carbon, 0.1–1,000 parts by weight of a conductive agent, and 0.03–90 parts by weight of a fibrillated carbon obtained by firing a fibrillated polymer in a non-oxidizing atmosphere.

2. A polarizable electrode according to claim 1, wherein the activated carbon is powdery, granular or fibrous.

3. A polarizable electrode according to claim 1, wherein the amorphous carbon is obtained by firing a thermosetting resin in a non-oxidizing atmosphere.

4. A polarizable electrode according to claim 3, wherein the thermosetting resin is at least one member selected from the group consisting of a polycarbodiimide resin, a phenolic resin, a furan resin, an epoxy resin, a melamine resin and a cellulose.

5. A polarizable electrode according to claim 1, wherein the conductive agent is at least one member selected from the group consisting of an expanded graphite, a carbon black, an acetylene black and a Ketjen black.

6. A polarizable electrode according to claim 1, wherein the fibrillated polymer is at least one member selected from the group consisting of a polycarbodiimide resin, a phenolic resin, a furan resin, an epoxy resin, a cellulose, a polyacrylonitrile, an aramid resin, a polyimide, a pitch and a rayon, all of which are fibrillated.

7. An electric double-layer capacitor comprising at least one pair of a positive electrode and a negative electrode each containing a polarizable electrode set forth in any one of claims 1–6 and each impregnated with an electrolytic solution.

8. An electric double-layer capacitor according to claim 7, wherein the positive electrode and the negative electrode each comprise an appropriate current collector and said polarizable electrode bonded thereto.

9. A polarizable electrode according to claim 1, wherein the carbon composite material is obtained by firing, in a non-oxidizing atmosphere, a carbon mixture composed mainly of:

100 parts by weight of an activated carbon, 0.1–100 parts by weight of a thermosetting resin, 0.1–1,000 parts by weight of a conductive agent, and 0.1–100 parts by weight of a fibrillated polymer.

10. An electric double-layer capacitor comprising at least one pair of a positive electrode and a negative electrode each containing a polarizable electrode set forth in claim 9 and each impregnated with an electrolytic solution.

11. An electric double-layer capacitor according to claim 10, wherein the positive electrode and the negative electrode each comprise an appropriate current collector and said polarizable electrode bonded thereto.

* * * * *